Aug. 4, 1959     F. M. FLOURNOY     2,897,623
INTERMITTENTLY ILLUMINATED FISHING LURE
Filed July 2, 1958
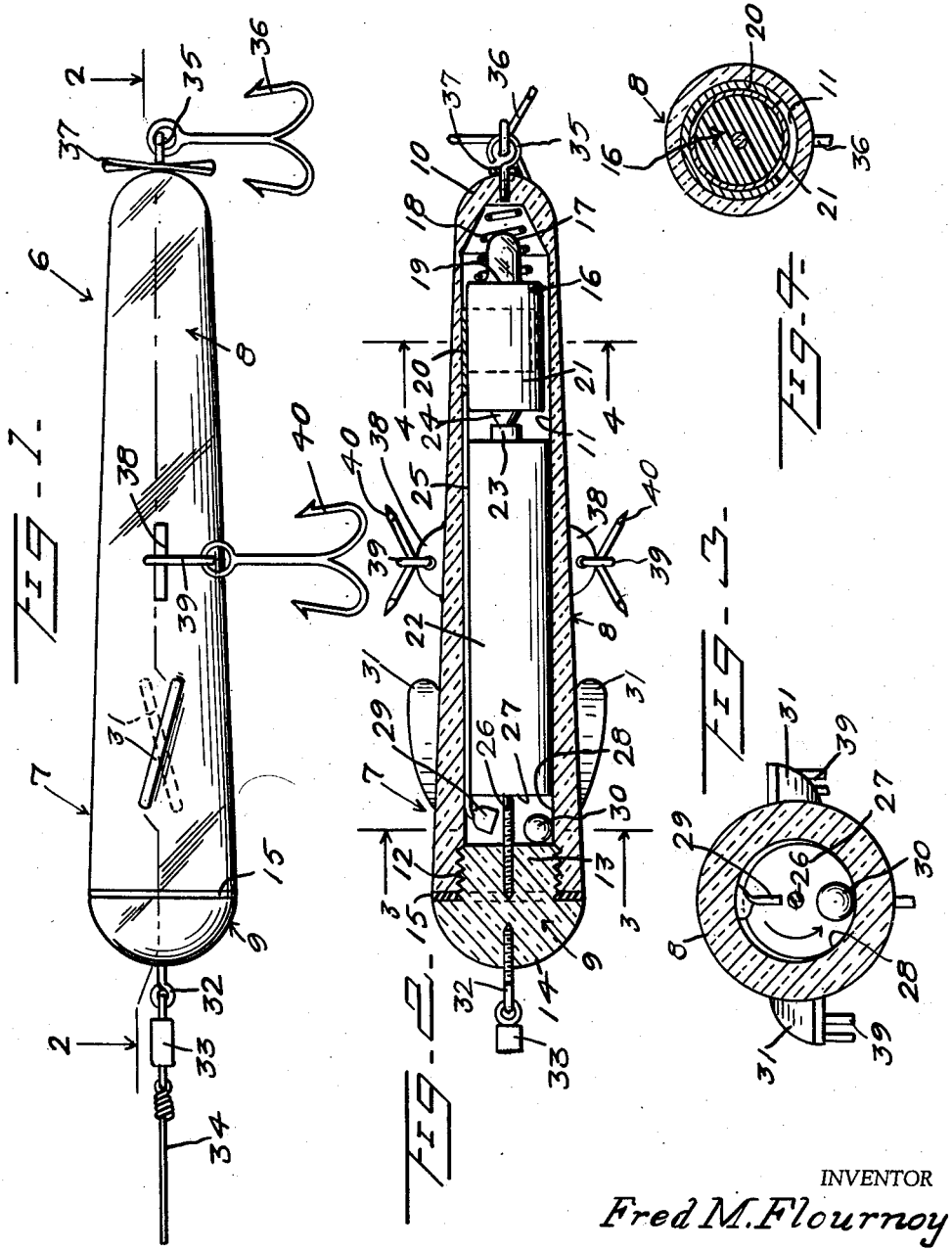
INVENTOR
*Fred M. Flournoy*
BY *John N. Randolph*
ATTORNEY United States Patent Office 2,897,623
Patented Aug. 4, 1959

2,897,623
INTERMITTENTLY ILLUMINATED FISHING LURE

Fred M. Flournoy, Wilsonville, Ala.

Application July 2, 1958, Serial No. 746,243

5 Claims. (Cl. 43—17.6)

This invention relates to a fishing lure of simple construction having novel means to effect an intermittent illumination of the lure as it is drawn through the water for attracting fish thereto.

More particularly, it is an object of the present invention to provide a lure having means to cause said lure to revolve about the axis thereof when drawn through the water, for causing an electric switch of the lure to be intermittently closed for completing momentarily an electric circuit between a light source and a self-contained electric current source contained within the lure body.

A further object of the invention is to provide an intermittently illuminated fish lure having a novel form of switch for effecting an intermittent closing of the electric circuit thereof and by means of which the number of essential parts of the lure can be reduced to a minimum.

Various other objects and advantages of the invention will hereinafter become more fully apparent from the following description of the drawing, illustrating a presently preferred embodiment thereof, and wherein:

Figure 1 is a side elevational view of the fishing lure;

Figure 2 is a longitudinal sectional view of the lure, taken substantially along the line 2—2 of Figure 1;

Figure 3 is an enlarged cross sectional view of the lure, taken substantially along a plane as indicated by the line 3—3 of Figure 2, and Figure 4 is an enlarged cross sectional view of the lure, taken substantially along a plane as indicated by the line 4—4 of Figure 2.

Referring more specifically to the drawing, the artificial fishing lure in its entirety is designated generally 6 and includes a lure body, designated generally 7, composed of an elongated hollow body portion 8 and a plug, designated generally 9. The body portion 8 is preferably cylindrical in cross section and slightly tapered toward its rear or trailing end 10. The body portion 8 has a chamber 11 extending nearly from end-to-end thereof, which is closed at its rear end by the tail portion 10 and which has an internally threaded open forward end 12.

The plug 9 forms the head of the lure body and has a restricted externally threaded portion 13 which is threadedly secured in the threaded chamber portion 12 for closing the forward end of the chamber 11. The exterior 14 of the remainder of the head 9 is preferably rounded and of a proper external diameter to form a smooth continuation of the forward end of the exterior of the body portion 8. A sealing gasket 15 is clamped between a part of the head 9 and the forward end of the body portion 8 and is disposed around the externally threaded nipple 13 to provide a moisture-proof seal for the chamber 11.

A small conventional flashlight bulb 16 is mounted in the rear portion of the chamber 11 with the globe 17 thereof facing toward the tail portion 10. A compression spring 18 has one end fitting loosely around the globe 17 and abutting against an annular rearwardly facing shoulder 19 of the light bulb. The other end of the spring 18 seats in the closed rear end of the chamber 11. A spring clip 20 fits snugly and resiliently around the cylindrical body portion 21 of the light bulb 16 and which constitutes the negative contact thereof. Said spring clip 20 has a relatively snug fitting engagement in the part of the chamber 11 occupied thereby, as seen in Figure 4.

A long slender dry cell or flashlight battery 22 is disposed in the chamber 11 between the light bulb 16 and plug 9 and has the positive contact 23 thereof facing rearwardly and normally engaging the forwardly facing positive contact 24 of the light bulb 16. A long, relatively narrow strip of metal 25 is fixed to and preferably formed integral with an intermediate portion of the clip 20 and extends from one edge thereof forwardly of the chamber 11 between a part of the battery 22 and a part of the wall of the body portion 8. The battery 22 has a snug fitting engagement in the chamber 11 with the strip 25 disposed between a longitudinal portion of said battery and a part of the wall of the body portion 8. A stem 26 is anchored in the restricted portion 13 of the plug 9 and projects therefrom inwardly of the chamber and has its rear end bearing against the rear negative end 27 of the battery 22 for holding said battery end spaced from the plug nipple 13 to provide a restricted chamber 28 therebetween. The opposite free end of the strip 25 extends into said chamber 28 and is twisted and bent to extend inwardly toward the stem 26 to provide a blade 29, the plane of which is disposed substantially parallel to the longitudinal axis of the lure body 7. Said blade 29 is spaced from and out of contact with the stem 26, and said stem 26 is preferably disposed axially of the lure body. A small ball or sphere 30 is loosely contained in the chamber 28. The clip 20, strip 25, stem 26 and ball 30 are all formed of electrical conducting material. The ball 30 is preferably solid so that it will normally be maintained in the bottom of the chamber 28 and is of a diameter so that it can rest upon a part of the wall of the body portion 8 and be out of contact with the stem 26, as seen in Figures 2 and 3. The parts 26, 29 and 30 form a novel electric switch, as will hereinafter be more fully described.

The lure body portion 8 has externally disposed fins or vanes 31 on opposite sides thereof and which are pitched in opposite directions, as best illustrated in Figure 3, so that when the lure 6 is drawn longitudinally through the water said lure will rotate about its longitudinal axis. The fins or vanes 31 are preferably pitched so that the lure body 7 rotates counterclockwise, looking from front to rear thereof, when pulled forwardly or from right to left of Figures 1 and 2.

A screw eye 32 is anchored in and projects forwardly from the center of the head 9 and a swivel 33 has one end attached to said screw eye 32 and an opposite forward end attached to an end of a fishing line or leader 34. A screw eye 35 is anchored in and projects rearwardly from the center of the tail portion 10 and has a multibarbed fishhook 36 attached thereto. A conventional spinner 37 is preferably mounted on the stem of the screw eye 35. The body portion 8 is also preferably provided with integral oppositely disposed outwardly projecting apertured lugs or extensions 38 to each of which is connected a ring or link 39. A multibarbed fishhook 40 is suspended from each link or ring 39.

The lure body 7, or at least the body portion 8 thereof, is formed of a translucent electrical insulating material such as Plexiglas. The compressed spring 18 maintains the contact 24 in engagement with the contact 23 and the contact 27 in engagement with the contact 26. As the lure 6 moves from right to left of Figures 1 and 2 through the water and is caused to revolve counterclockwise, as seen in Figure 3, the switch contact 29 will rotate counterclockwise about the stem 26, which stem 26 substantially coincides with the axis of rotation of the lure body 7. As the switch contact or blade 29 completes nearly a half revolution in a counterclockwise direction from its position of Figure 3, it will engage the loose switch contact 30 to cause said spherical contact to move with the contact 29 counterclockwise through an arc somewhat greater than 90° and until the blade or contact 29 is slightly above a horizontal position. At that time, the loose contact or ball 30 will roll radially inward into engagement with the stem 26, and while still supported by the blade 29 to thus complete the electric circuit through the light bulb and battery for energizing the light bulb to illuminate the body portion 8. Before the blade 29 can complete its revolution and resume its position directly above the stem 26, as seen in Figure 3, the loose contact or sphere 30 will roll off of the stem in a direction away from the blade 29 to thus break the electric circuit to the light bulb 16. It will thus be seen that the bulb 16 will only be illuminated momentarily during each revolution of the lure body 7 about its axis. The spacing between the nipple 13 and blade 29 and between said blade 29 and battery end 27 is less than the diameter of the sphere 30 so that at each revolution of the lure body the sphere is elevated and rolls over the switch contact or stem 26 and drops out of engagement therewith.

Various modifications and changes are contemplated and may be resorted to, without departing from the function or scope of the invention as hereinafter defined by the appended claims.

I claim as my invention:

1. An intermittently illuminated fishing lure comprising a lure body having a sealed chamber and including a translucent portion, a light bulb, a battery, and means forming an electric circuit connecting the light bulb and battery, said light bulb, battery and means being contained within the chamber of said body portion, an actuating means fixed to and disposed externally of the body portion and actuated by movement of the fishing lure through the water for causing said body portion to rotate about the axis thereof, said means forming the electric circuit including a make and break switch having two radially spaced contacts fixed to and rotating with the body portion, one of said contacts moving in a circular path around the axis of the other contact when the body portion is revolved about its axis, and said switch including a third contact loosely confined in the chamber of the body portion and disposed to be engaged and carried by said first mentioned contact during a part of each revolution of the lure body for elevating said loose contact to a position from which the loose contact will move by gravity to momentarily bridge said spaced contacts to complete the electric circuit and to thereafter move out of engagement with both of said spaced contacts to break the electric circuit.

2. An illuminated fishing lure as in claim 1, said other spaced contact coinciding with the axis of rotation of the lure, and said loose contact comprising a sphere disposed in the path of rotational travel of said first mentioned contact.

3. An illuminated fishing lure as in claim 1, said switch being disposed in a confined space of said chamber of the body portion for retaining said loose contact in the path of travel of said first mentioned contact.

4. A fishing lure comprising an elongated lure body, means carried by said lure body and actuated by movement of the lure through the water for causing the lure body to rotate about the axis thereof, said lure body having an enclosed chamber, a light bulb, a battery and electric circuit contained within said chamber, said electric circuit including a switch for making and breaking the electric circuit between the light bulb and battery, said switch including a first contact, a second contact radially spaced from said first contact and moving with the lure body in a circular path around the axis of the first contact when the lure body is revolved, and a third contact loosely confined in said chamber in the path of movement of said second contact and engaged and carried by the second contact during a part of each revolution of the lure body, said loose contact being gravity actuated to move momentarily into engagement with the first and second contacts for completing the electric circuit and for thereafter moving out of engagement with both contacts to break the electric circuit.

5. In combination with a body member and means connected to and effecting rotation of said body member, a light bulb, a battery, and an electric circuit connecting the light bulb and battery, said light bulb, battery and electric circuit being supported by said body member, said electric circuit including a switch for making and breaking an electric connection between the light bulb and battery, said switch including a first contact, a second contact radially spaced from said first contact and movable with the body member around the axis of the first contact when the lure body is revolved, and a third contact, said body member having a chamber in which said contacts are disposed and in which said third contact is loosely confined in the path of movement of the second contact, said third contact being normally maintained by gravity out of engagement with the first and second contacts and being engaged and carried by the second contact, during a part of each revolution of the body member, to an elevated position relative to the first and second contacts and from which position said third contact is gravity actuated to move momentarily into engagement simultaneously with the first and second contacts for completing the electric circuit and for thereafter moving out of engagement with both contacts to break the electric circuit.

References Cited in the file of this patent

UNITED STATES PATENTS

| 2,128,899 | Barnhart | Sept. 6, 1938 |
| 2,598,471 | Waite | May 27, 1952 |
| 2,700,841 | Johnson | Feb. 1, 1955 |